(12) United States Patent
Siegel

(10) Patent No.: US 8,700,984 B2
(45) Date of Patent: Apr. 15, 2014

(54) COMPUTERIZED METHOD AND COMPUTER PROGRAM FOR DISPLAYING AND PRINTING MARKUP

(75) Inventor: Gary Siegel, Miami, FL (US)

(73) Assignee: Gary Siegel, Miami, FL (US)

( * ) Notice: Subject to any disclaimer, the term of this patent is extended or adjusted under 35 U.S.C. 154(b) by 119 days.

(21) Appl. No.: 12/424,005

(22) Filed: Apr. 15, 2009

(65) Prior Publication Data

US 2010/0269033 A1    Oct. 21, 2010

(51) Int. Cl.
G06F 17/00 (2006.01)

(52) U.S. Cl.
USPC ............ 715/230; 715/231; 715/232

(58) Field of Classification Search
CPC .................................. G06F 17/241
USPC ......................... 715/263, 230–232
See application file for complete search history.

(56) References Cited

U.S. PATENT DOCUMENTS

| | | | |
|---|---|---|---|
| 4,974,194 A | 11/1990 | Barker | |
| 5,043,891 A | 8/1991 | Goldstein et al. | |
| 5,146,552 A | 9/1992 | Cassorla et al. | |
| 5,148,366 A | 9/1992 | Buchanan et al. | |
| 5,313,394 A | 5/1994 | Clapp | |
| 5,598,518 A | 1/1997 | Saito | |
| 5,666,139 A | 9/1997 | Thielens et al. | |
| 5,666,552 A | 9/1997 | Greyson et al. | |
| 6,185,591 B1 | 2/2001 | Baker et al. | |
| 6,230,170 B1 | 5/2001 | Zellweger et al. | |
| 6,317,739 B1 | 11/2001 | Hirata et al. | |
| 6,551,357 B1 | 4/2003 | Madduri | |
| 6,567,830 B1 | 5/2003 | Madduri | |
| 6,583,793 B1 | 6/2003 | Gould et al. | |
| 6,583,798 B1 | 6/2003 | Hoek et al. | |
| 6,584,479 B2 | 6/2003 | Chang et al. | |
| 2002/0054059 A1* | 5/2002 | Schneiderman | 345/700 |
| 2002/0087595 A1 | 7/2002 | Friedman et al. | |
| 2002/0188636 A1 | 12/2002 | Peck et al. | |
| 2003/0023642 A1 | 1/2003 | Spragins | |
| 2003/0028850 A1 | 2/2003 | Quinn et al. | |
| 2003/0097640 A1 | 5/2003 | Abrams et al. | |

(Continued)

OTHER PUBLICATIONS

Bill Camarda, Special Edition Using Microsoft Office Word 2003, Dec. 2003, QUE Publishing, pp. 69, 817, 821, 820, 827, 830, 828, 106, 468, 469, 431.*

(Continued)

*Primary Examiner* — Adam M Queler
*Assistant Examiner* — Howard Cortes
(74) *Attorney, Agent, or Firm* — Patrick C. Cesarano; Michael C. Cesarano

(57) ABSTRACT

The present invention provides a computerized method and computer program product for automating the traditional markup process such that changes to an original digitized document are displayed on the face of the original digitized document and may be printed as displayed. This invention automates the markup process by adding markup clusters to the original digitized document. A markup cluster comprises three elements: a reference graphic, a white space graphic, and a connector. The reference graphic indicates the location and type of change to existing text. The white space graphic indicates the change in text and is displayed in the margin or white space. The connector is a graphic that does not cross over text and indicates a relationship or "connection" between the reference graphic and the white space graphic. The resulting markup cluster is displayed on the original digitized document and optionally may be printed as displayed.

26 Claims, 16 Drawing Sheets

(56) References Cited

U.S. PATENT DOCUMENTS

| | | | |
|---|---|---|---|
| 2003/0214528 A1* | 11/2003 | Pierce et al. | 345/723 |
| 2004/0044966 A1 | 3/2004 | Malone | |
| 2004/0078786 A1 | 4/2004 | Hoolahan et al. | |
| 2004/0163042 A1* | 8/2004 | Altman | 715/512 |
| 2006/0210163 A1* | 9/2006 | Garside et al. | 382/186 |
| 2008/0267534 A1* | 10/2008 | Madhvanath | 382/305 |

OTHER PUBLICATIONS

Ted Padova, Adobe Acrobat 8 PDF Bible, Feb 2007, John Wiley & Sons. Chapter 20, Section 4.*

Screenshots 1-5; Word 2003; Released: Nov. 17, 2003.*

John Deubert, Visual Quickstart Guider Adobe Acrobat 8,2006, Peachpit Press, pp. 73-95.*

Ted Padova, Adobe Acrobat 8 PDF Bible, 2007, Wiley Publishing , pp. 545-548, 551-552.*

Brian Wood, Adding comments to PDF files, retrived Jul. 2012, pp. 1-2.*

Adobe Acrobat Supporting Screenshots (Adobe Acrobat, generated Jul. 2012) pp. 1-2.*

This disclosure is not non-patent literature per se, but is being disclosed in this section. Gary R. Siegel currently markets and offers for sale to the public a real estate document editing computer program which allows a limited strikeout function, but no markup clusters are used and is not automated. See attached screen shot samples of the computer program, marked Exhibits 1-3.

* cited by examiner

FIG. 1

PURCHASE AGREEMENT

This Agreement is made and entered into this _____ day of _____, by and between ABC Corporation ("Seller") and XYZ, Inc. ("Buyer").

For and in consideration of $10.00 and other good and valuable consideration, the parties agree as follows:

SECTION 1.01: These are the terms of this agreement. The Buyer agrees to buy and the Seller agrees to sell the items described in this document. Here are some more provisions of this agreement. The parties to this agreement will abide by each and every term of this agreement. By signing below, the parties consent to enforcement of this agreement. These are the terms of this agreement. The Buyer agrees to buy and the Seller agrees to sell the items described in this document. Here are some more provisions of this agreement.

FIG. 2A

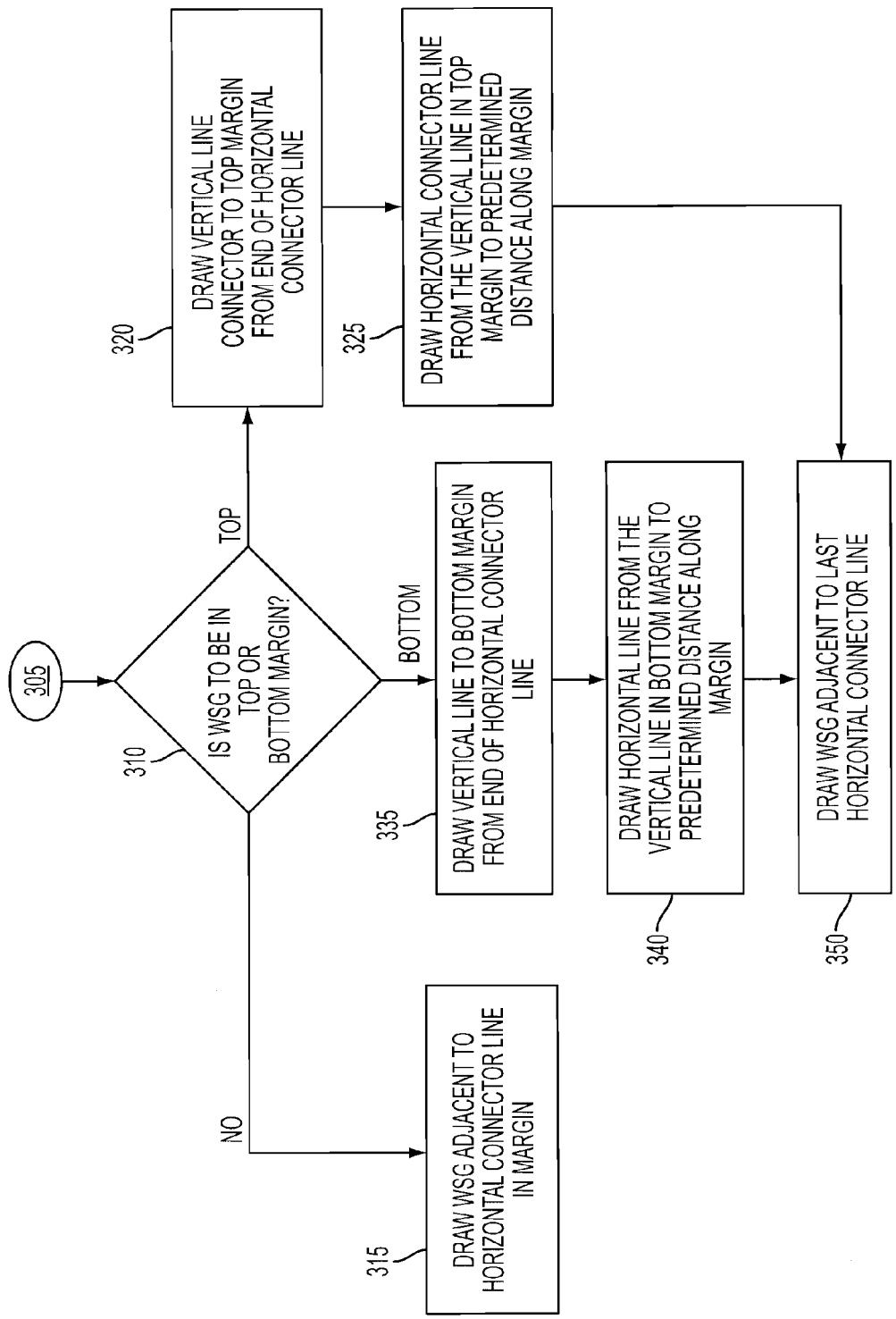

COMPUTERIZED METHOD AND COMPUTER PROGRAM FOR DISPLAYING AND PRINTING MARKUP

STATEMENT REGARDING FEDERALLY SPONSORED RESEARCH OR DEVELOPMENT

This invention has been created without the sponsorship or funding of any federally sponsored research or development program.

FIELD OF THE INVENTION

The present invention relates to a method, system and program for electronically marking up documents with changes, for review, display and printing.

BACKGROUND OF INVENTION

Particularly, although not limited to the legal field, it is frequently necessary to mark up documents with changes such that other persons wishing to review the changes can see the original document and the changes. Traditionally this has been done by hand by entering words, lines and symbols to indicate the changes and their location, thus the term "markup" (of the document) is used.

An example of a document that may need to be marked up is a "pre-printed" real estate contract. When using a standardized "pre-printed" contract, it is often necessary to make changes during the possibly lengthy review process. Overlaying the changes on top of the original document enables those revising or executing the document to view both the original document and the overlaid changes. The signor can sign the contract and approve and accept each change by initialing each overlaid change. Once a user has read the original document, as changes are proposed the user need only review the overlaid proposed changes as both the original document and overlaid proposed changes are visible. If changes are overlaid onto the original document in this manner, the document reviewer does not need to take the time to re-read the entire document to look for text insertions and deletions, as are typically performed by text editors, which may be difficult to spot. The same process applies to computerized documents. It is often desirable to always display and print a standard computerized document in a fixed format similar to a pre-printed paper contract, with custom text being added to blank spaces. By doing so, the standardized portion of the document appears the same regardless of the computer system that displays and prints it. Such a document may be considered as an electronic version of a "pre-printed" document. Even with the computerized document, it is often necessary to mark up the standardized text with changes.

Although word processing programs are able to "track changes" in subsequent versions of a computerized document, no electronic system that mirrors the traditional hand markup of a document exists. Track changes results in shifting text and ultimately results in changes being merged into the original document, and no record of the changes remain. In the traditional markup system, all changes are memorialized on the original document. While it is possible with a graphics program to draw lines on a document and enter text, this procedure is extremely cumbersome and lacks automation. The present invention fills the need for a simple to use electronic program that maintains the advantages of, but automates the traditional markup process. Thus, the traditional markup process is simulated and automated by the invention.

Advantages of the present invention over the traditional markup process are speed, convenience, and automation of the markup process. The invention also provides the ability to modify the location, font-size, and text of the markup, which is not easily accomplished with the traditional ink on a document process. Although a graphics program could accomplish some of the same abilities, its use is difficult, inconvenient and not automated. The present invention provides additional functions such as easily deleting a markup in its entirety.

DESCRIPTION OF RELATED ART

Text editors, such as WordPerfect™ and Microsoft Word™, allow users to make changes to a document. However, when adding or removing words, text editors alter the positioning of existing text in the document and the changes (added or deleted words) can be buried/lost in the text, making it difficult to identify changes to the document. With traditional text editors, document integrity is not preserved.

Some text editors permit users to track the changes made to a document. For example, when replacing a word while tracking changes, the original word would appear stricken through and adjacent to it would appear the new word. Text to the right of the change is moved to make room for the new word. Subsequent sentences and paragraphs are moved and adjusted as needed. This shifting of text makes it difficult to ascertain changes in subsequent lines when compared to the original text. The shifting of text can also create undesirable document formatting, e.g. pagination or column changes. Changes may be accepted and merged into the document individually or as a whole. When changes are accepted, track changes ultimately results in all changes being incorporated into the document and no record of changes remain, making it extremely difficult to compare previous versions and subsequent versions to a document. Even if all track changes are not accepted and incorporated, locating these changes is tedious and errors are easily made. The reader is uncertain which tracked changes are visible as several may have been incorporated into the document and scanning the text for these changes is tedious and fraught with errors.

In graphics programs (such as Adobe® Illustrator® or Microsoft® Paint), lines, text and graphics may be added to documents. However, doing so with these and other existing programs is time-consuming and cumbersome. For example, if a user wants to propose a change to a single word in a document the process involves: (1) locating the horizontal beginning and ending of the line over the desired text and not adjoining spaces; (2) locating the vertical center of the text line at beginning and ending positions; (3) entering required commands to locate and draw a line; (4) locating the desired position for the replacement text in margin; (5) entering the required commands and the replacement text in the margin location; (6) Adjusting the font size so the text fits in the desired location; (7) entering the required commands to draw a box around the replacement text; and (8) entering the required commands to draw line(s) that connect the box containing the replacement text to the end of the strikethrough line that was originally drawn over the word(s) to be replaced. Additionally, since all lines need to be parallel or perpendicular and intersect at a visually appealing point in order to snake through and not cross text, the user must manually accomplish this alignment, a laborious task at best. With existing graphics programs, each element (i.e., each line segment, word, and graphical element) must be created individually and added to the document one at a time. For each line segment, the user must specify the start and end points. There is no automated or convenient way to add an entire markup without adding each element of the markup individually so that the lines do not overlap text. Each individual element must be sized and positioned manually.

Using existing graphics programs, once the markings are added it is possible to make changes to them. However, each markup element must be adjusted or resized individually, essentially requiring the user to recreate the graphic, which is time-consuming and cumbersome.

Systems exist to display changes on electronic media (Madduri U.S. Pat. No. 6,567,830). However, these systems do not provide the information of traditional markups. For example, in Madurri text is only added in between lines, only on the display, and then incorporated into the document with text shifting. Thus, no record of the changes in the final document is preserved. Madurri does not address printing the original document as displayed, which is different from the present invention where the modifications or markups are printed in the same position relative to the original document as displayed. Specifically, the present invention is WYSIWYG or What You See Is What You Get. WYSIWYG describes a system in which content is displayed during editing as it will appear in printed output. With WYSIWYG, all changes are displayed on the face of the document. The original document and the markup overlaid onto the original document are printed as displayed, preserving the integrity of the original document. Markup may be removed, if desired, and the document may be displayed and printed in its original form.

The present invention is distinct from Madurri, which is not WYSIWYG. In Madurri, the invention has no provision for printing and/or accurately displaying the original document as printed; and does not provide any means to simulate traditional markup systems or their inherent advantages, such as permanency; and superimposes a graphic over existing text while the graphic is not to be printed; and requires space between lines of text to display markup containing text (which space may be larger than the space in the original document); and has no provision for adding markup to margins or other white space apart from between lines. Due to these limitations, the Madurri invention is not suitable for displaying markup on single-spaced documents without obscuring the original document text; and is not suitable at all for printing a document "as is" with overlaid changes in white space for display on the original document. The Madurri invention is also not suitable for marking up a standardized electronic document.

In summary, in order to markup a document with changes, for displaying and printing, it is often necessary to overlay a group of logically related elements to indicate the intended change without otherwise changing the appearance of the original document; either manually or using existing computer programs it is time-consuming and cumbersome to add or modify each element individually.

SUMMARY OF THE INVENTION

It is the object of this invention to automate the traditional markup process. This invention automates the markup process through an automated system that adds one or more markups to the document. The markup is a cluster of three elements: 1) a reference graphic, 2) a white space graphic, and 3) a connector. The reference graphic indicates the location and type of change to existing text. The white space graphic contains the change in text and is visually displayed in the margin or other white space. The connector is a graphic that indicates a relationship or "connection" between the reference graphic and white space graphic and does not cross over text. The system provides for various automated functions as described in the embodiments of this invention. These functions include, but are not limited to: Insert Between Lines, Insert Between Words, Single Line Strikeout and Replace, Adjacent Line Strikeout and Replace, and Z Strikeout and Replace. The system determines the appropriate function based on the user input. User input of new or revised text is provided by a keyboard, voice input device, or other input device. The user conveys the type of function desired by defining one or two points on the original document. The program determines the desired function from either 1) the location of a single point relative to the document text; or 2) the relative location of two points to each other and to the document text. The user inputs the one or two points by a click or a drag of a mouse, respectively or by other action(s) via another input device. The addition of text is also used in certain circumstances to determine the function desired. For example, the entry of text plus a click of the mouse on a line of text between words is automatically recognized by the system as the Insert Between Words function and the system will automatically display the elements of this markup function.

Additionally, intelligent functions are provided to assist in moving the reference graphic and/or the white space graphic. Intelligent functions maintain the integrity of the cluster by keeping all elements of the markup cluster connected, not permitting the connector to cross text, and keeping the white space graphic in white space.

The document to be marked up generally comprises discrete characters of text, and formatting information and is stored in any appropriate media, including electronic or hardcopy. The document is input to the program through an appropriate media reading device, data transfer method, or manually via keyboard. Once correctly input, the original document is not modified again. The program creates an internal table (document character location table) stored in memory, or other appropriate media, that provides the location of each line of text and each character including spaces on each line of the document. The document is displayed on the display monitor and an end-user adds markups to the document via two steps:

Step 1. The user enters text he wishes to add (or replace existing text with) that will appear in the white space graphic in the document white space; and Step 2: The user defines a location and function using a simple single mouse click or drag. From the location of the mouse click or the start and end points of the mouse drag, the program generates the reference graphic indicating the location and type of change in the original document, e.g. strikeout line or insertion point as appropriate for the desired function; and adds the new text in the white space of the document margin (white space graphic); and a connector, generally consisting of one or more perpendicular intersecting line segments, that connect the reference graphic to the white space graphic in the white space of the document margin. The connector is automatically located such that it does not cross over any text.

The invention has various default settings that may be changed by the user. White space graphic settings such as general location preference for the white space graphic, character orientation, font style, font size, text borders, etc. are selectable and may be customized. The user may also enter other preferences such as the reference graphic style and connector appearance. Lines used in connectors and reference graphics may be of varying thickness and styles (dashed, repeating letter, repeating symbol, outlined, curvy, etc.). Insertion points for reference graphics may be dots, carets, or other symbols.

In the preferred embodiment, for example, in order for the user to indicate that a word or words are to be inserted between two existing words in the original document ("Insert Between Words"), the user simply enters the new word(s) in the text box by entering letters on a keyboard and then clicks on the space between the original two words. The invention draws a dot (being the selected reference graphic), indicating the insertion point between the two words and places the white space graphic with the new text in the selected margin with a series of connected line segments in the document white space, from the dot to the selected margin. The user can specify an area/region for the location of the white space graphic by selecting a general location preference for the white space graphic to be added.

As an additional example, in order for the user to indicate that the new words replace existing text the process is similar as described above. After entering the new text, instead of clicking on the position between words, the user drags a mouse over the words to be stricken, and in that event a strikeout line (reference graphic) is drawn over the word(s) that are to be replaced and a connector is drawn in the document white space from the strikeout line to the default margin and places the white space graphic with the new text in the selected margin adjacent to the connector ("Line Strikeout and Replace").

BRIEF DESCRIPTION OF THE DRAWINGS

In describing the invention, reference will, at times, be made to the accompanying drawings in which:

FIG. 1 is a screen shot of the invention in its preferred embodiment, showing an original document, text entry box, various options, and the drop down menu box for white space graphic general location preference.

FIG. 2A is an enlargement of FIG. 2 showing the elements of the markup function that inserts text between words.

FIG. 11 illustrates system logic for determining whether additional connector segments are needed depending on the general location preference for the white space graphic and, drawing of the white space graphic.

DETAILED DESCRIPTION OF THE INVENTION

Figure 2:
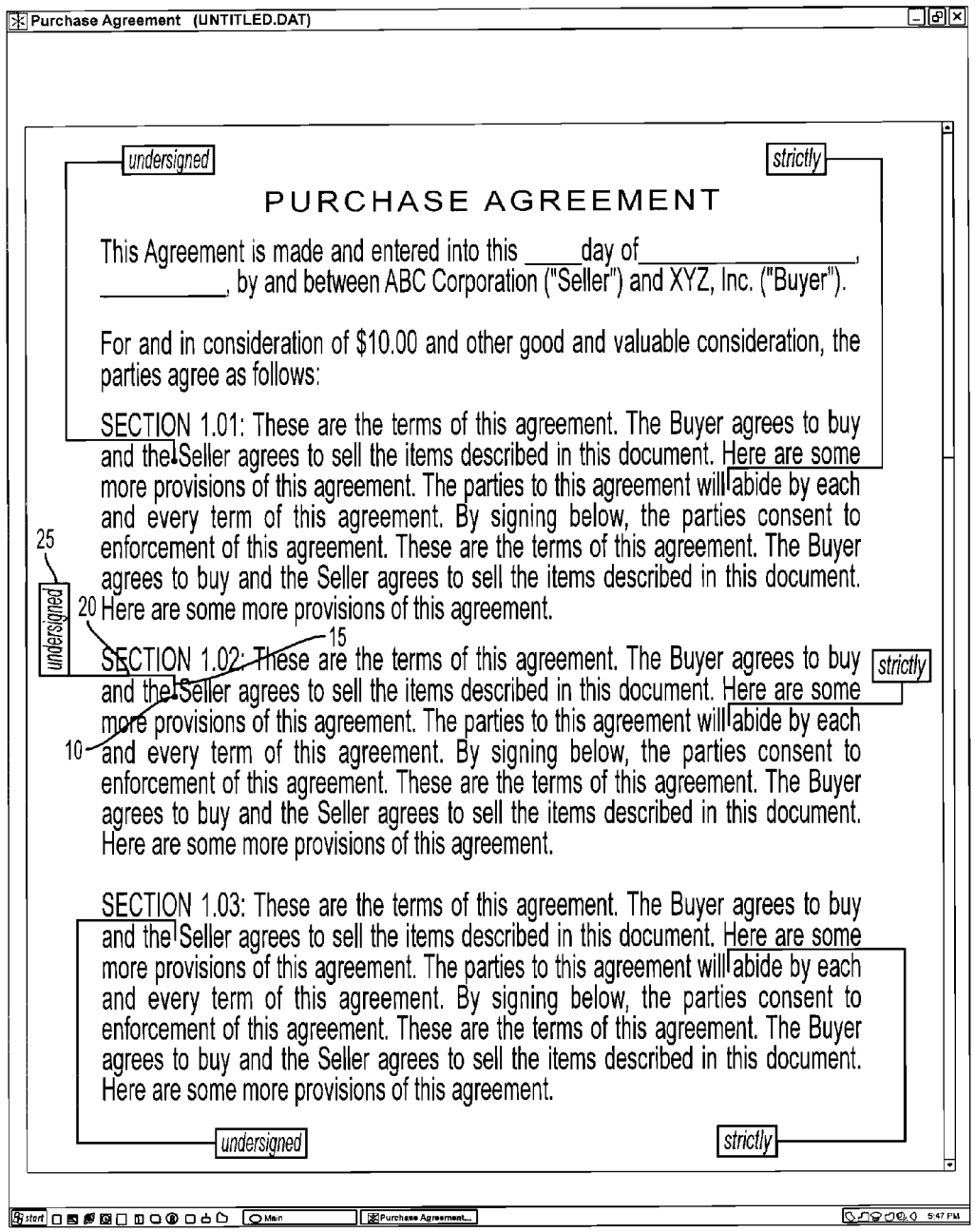
FIG. 2 is an example of a markup function that reflects an insertion of text between words.

Before the subject invention is described further, it is to be understood that the invention is not limited to the particular embodiments of the invention described below, as variations of the particular embodiments may be made and still fall within the scope of the invention. It is also to be understood that the terminology employed is for the purpose of describing particular embodiments, and is not intended to be limiting.

The details of one or more embodiments of the invention are set forth in the accompanying drawings and the description below. Other features, objects, and advantages of the invention will be apparent from the description and drawings, and from the claims. In the following description, numerous specific details are set forth to provide a thorough understanding of the embodiments. One skilled in the art to which this invention belongs will recognize, however, that the techniques described can be practiced without one or more of the specific details, or with other methods, components, materials, etc. In other instances, well known structures, materials or operations are not shown or described in detail to avoid obscuring certain aspects.

In this specification, the singular forms "a," "an" and "the" include plural references unless the context clearly dictates otherwise. Unless defined otherwise, all technical and scientific terms used herein have the same meaning as commonly understood to one of ordinary skill in the art to which this invention belongs.

DEFINITIONS

The following terms used within the specification are defined in a way that best describes the invention and is understood by one skilled in the art to which this invention belongs as not being limiting:

An "original document" is defined as the document that is to be marked up. The document is input to the program through an appropriate media reading device, data transfer method, or manually via keyboard. Once correctly input, the original document is not modified again. It is entered into the program before any markup takes place, and when adding markup the original document is not modified. The original document is such that a computer program is able to detect line and character positions by either examining the document or by obtaining the information via included meta data or separately supplied table.

A "reference graphic" is defined as a reference point or graphic, that together with its location in relation to the text on the original document indicates the function of the markup. The reference graphic does not necessarily cover text, but may be placed over one or more characters. A reference graphic can be, but is not limited to a dot, line strikeout, repeating character strikeout, Z strikeout, underline or any other suitable combination of characters or graphics conveying the location and type of modification desired.

A "point type reference graphic" is defined as a reference graphic that is a point, dot, caret or other graphic that indicates the location of a geometric point.

"White space" is defined as a portion of the page of the original document that does not contain text such as the document margins or horizontal space between lines of text or between characters.

A "white space graphic" is defined as added text or graphic containing text that is to be located in the white space, such as the margin or between blocks or lines of text in the original document. Added text may be surrounded by a border, or in some other way set off or emphasized, or combined with another graphic. The white space graphic is always located within a white space and never appears over text in the original document.

A "connector" is defined as a graphic that indicates a relationship or connection between a reference graphic and the white space graphic such as a series of intersecting line segments that extend from the reference graphic to the white space graphic. A connector is located within white space and does not appear over text in the original document.

A "line strikeout" is defined as a graphic such as a single continuous line or series of points in a single continuous line or repeating characters in a single continuous line, which indicates the deletion of text.

An "adjacent line strikeout" is defined as a reference graphic that includes more than one line strikeout over continuous text on adjacent lines of text.

A "cluster" is defined as comprising a reference graphic, connector, and a white space graphic.

A "user-defined location" is defined as a single point or series of two points that provide the position of the reference graphic.

"Between Lines" is defined as the half-way point between the bottom of a horizontal line of text and the top of the next line of text.

"Between Words" is defined as the mid-point between the end of one word of text and the start of the next word of text that appear on the same horizontal line of text.

A "Start Point Anchor" is defined as a graphical element that appears adjacent to the starting point of a markup, but is not part of the markup and is not printed with the document. It also acts as a control that can be moved by the user in order to manually reposition the markup; in the present embodiment it is blue in color.

An "End Point Anchor", similar to a start point anchor, is defined as a graphical element that appears adjacent to a markup. It is used to indicate the end point of a line segment on a display, but is not part of the markup and is not printed with the document. It also acts as a control that can be moved by the user in order to manually resize or reposition line segments; in the present embodiment it is red in color.

"Computer" refers to a machine that can: store data; display a document; print the document without significantly changing the appearance of the document, except that the height and width of the document may be uniformly resized; overlay graphics and text onto the displayed document at specified display coordinates; while printing the document, print additional graphics and text that were not part of the original document; receive and store user inputted text, such as keyboard entry; receive and store display coordinates of the position where markup is to be overlaid onto the displayed document, such as by saving and storing the coordinates of a display where a mouse click occurs; run programs created by standard programming languages capable of carrying out the requirements of this invention, such as C++®, Visual Basic®, Visual Basic.NET®, C#.NET® and Java™. (An example of such a system is a personal computer running the Microsoft Windows® (98/ME/2000/XP Pro, XP Home, Vista) operating system, or AIX®, OS/390®, UNIX®, OS/2™, MVS™, Linux® and SUN Solaris™ operating systems, and Apple MacIntosh® operating systems.)

"Computer usable storage medium" refers to and is limited to physical storage media, such physical storage media including such common forms, for example, as a magnetic disk, hard disk, an EPROM, a CD-ROM. The term as used herein describes non-transitory computer-readable storage media and excludes signals, carrier waves and the like.

DETAILED DESCRIPTION OF DRAWINGS

Figure 1:
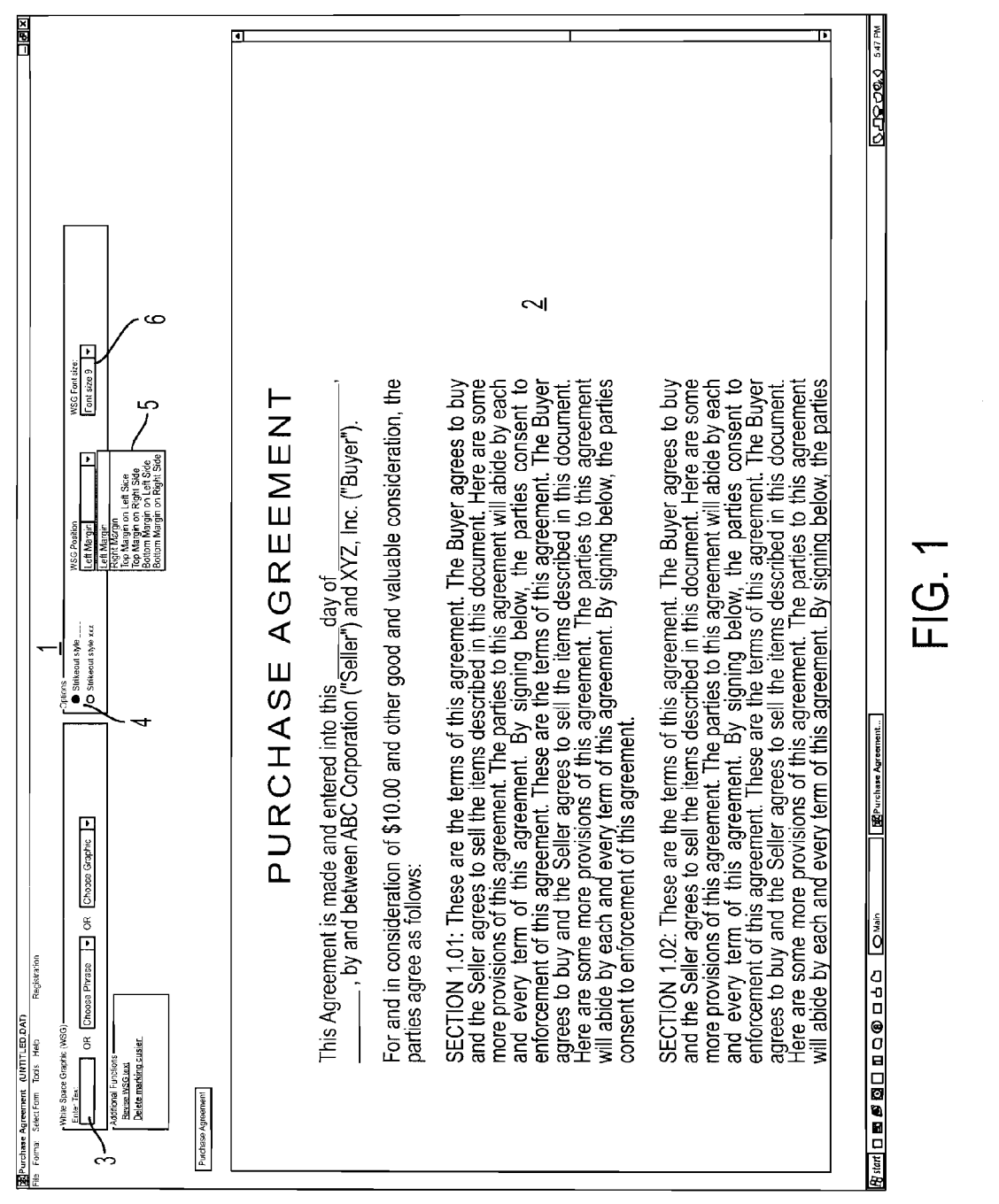

In describing the invention, FIG. 1 is a screen shot showing the Text Entry Box 3 and various options 1 and the original document 2 before any markup is added by a user. FIG. 1 also shows a view of the Text Entry Box 3 where the user enters text that the user wishes to be added to the original document 2. The user also has the option to select or change the font size 6 for the entered text, otherwise the default setting is applied. FIG. 1 also shows the option for selecting the general location preference for the white space graphic via a Drop Down box 5, otherwise the default location will be used. FIG. 1 also shows options 4 for the reference graphic. The user may choose the strikeout style: either the default single line strikeout or a series of repeating x's.

FIGS. 2 and 2A show examples of the markup function "Insert Between Words". In FIG. 2 the markup function Insert Between Words is a cluster consisting of: a reference graphic 10 which is a dot; a connector with line segments 15 and 20; and white space graphic 25. In FIG. 2A markup function Insert Between Words is a cluster consisting of: a reference graphic 10 which is a dot; a connector with line segments 15, 20, 30, and 35; and white space graphic 40. For the markup function Insert Between Words, the user enters the text to be inserted in the white space graphic over the original document 2, into the Text Entry Box 3 of FIG. 1. Then, using the mouse, the user positions the cursor between the words over the original document 2 where the insertions should occur, and clicks the mouse.

Figure 7:
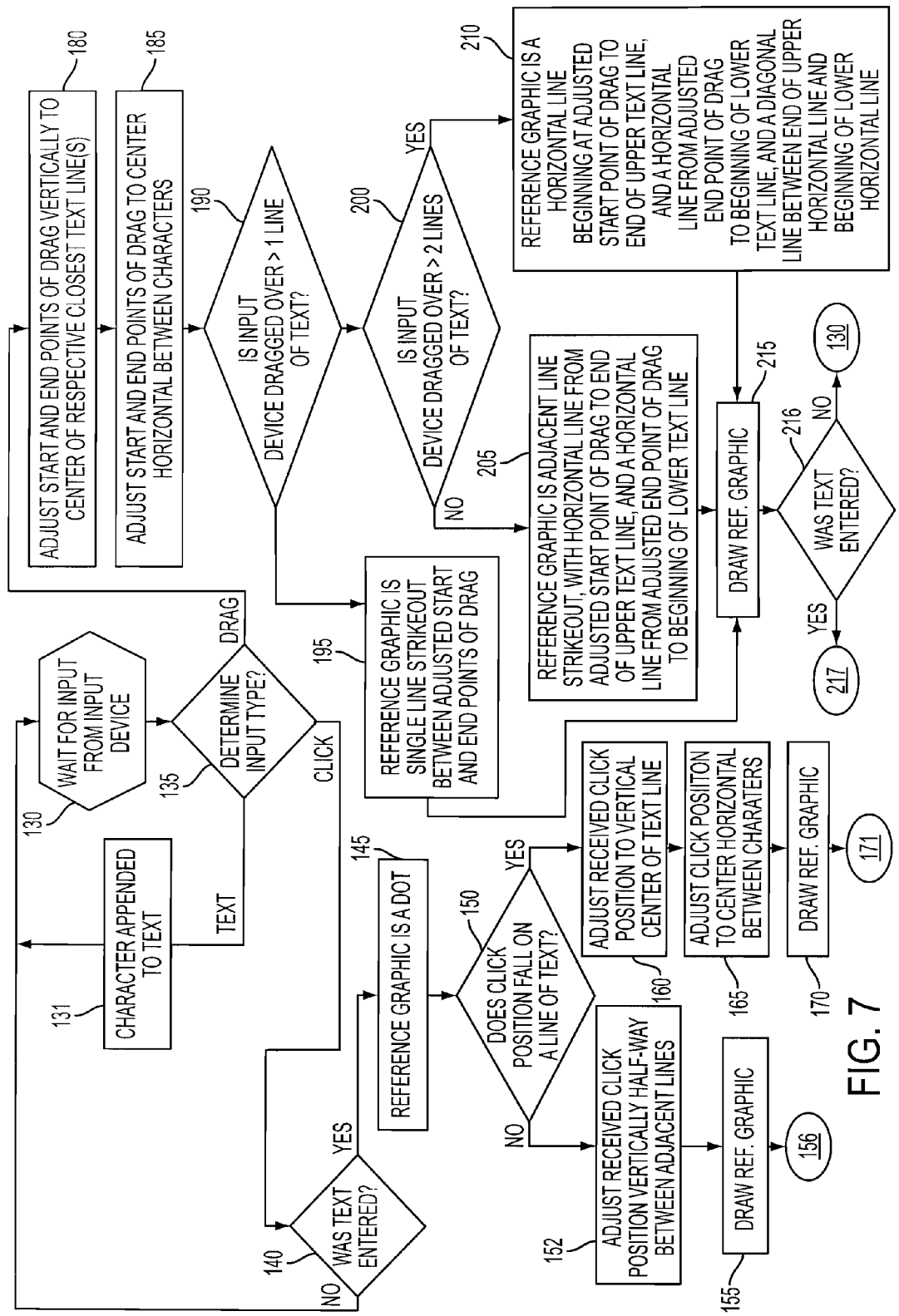
FIG. 7 illustrates system logic for determining the type and location of: reference graphic, connector and white space graphic from a combination of keyboard and non-keyboard user input device such as a mouse.

FIG. 7 illustrates the internal logic of the system for markup functions. At Block 130, the system waits for input. On input, control is transferred to block 135. If input is text, control is transferred to block 131 where character(s) are appended to the previously entered text string. Control is then transferred back to block 130. For markup function Insert Between Words, when the user is finished entering text, the user inputs a click via the mouse and control is transferred to block 135. The system then determines that a click was entered and control is transferred to block 140. If no text has been entered, control is transferred to block 130, to wait for input. If text was previously entered control is transferred to block 145 where the reference graphic is a dot and control is transferred to block 150 At block 150 the system determines whether the click position falls on a line of text. For markup function Insert Between Words, since the mouse click is on a line of text control is transferred to block 160, where the received click position is adjusted to the vertical center of the text line. Control is then transferred to block 165 to further adjust the received click position to center it horizontally between characters and transfer control to block 170 to draw the reference graphic, which is a dot 10, at the adjusted click position. Control is transferred to block 235 as shown in FIG. 9.

Figure 9:
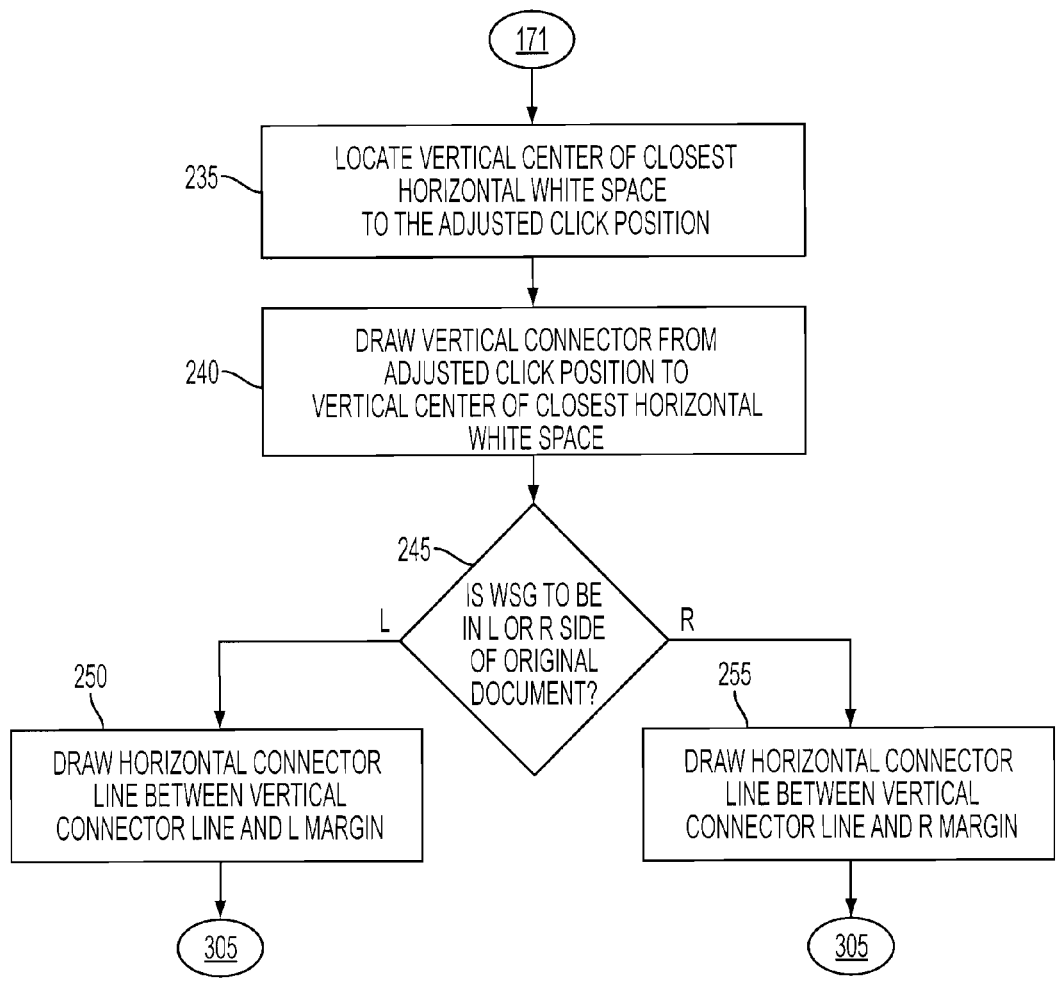
FIG. 9 applies to the markup function Insert Between Words and illustrates the system logic for generating the connector that extends from the reference graphic that is a dot to the white space within the left or right margin of the document.

For markup function Insert Between Words, FIGS. 9 and 11 illustrate the system logic for creating a connector from the reference graphic (which is a dot in this case), to the white space graphic. Preferences for location of the white space graphic within the margin of the document may be selected from the Drop Down box 5 shown in FIG. 1. If the user has not selected a general location preference for the white space graphic, then the system defaults to the left margin. FIGS. 2 and 2A illustrate several markup clusters created using various chosen locations for the white space graphic for markup function Insert Between Words.

In FIG. 9, control starts at block 235 to locate the vertical center of the closest horizontal white space to the adjusted click position. Control is then transferred to block 240 to draw the vertical connector segment 15 from the adjusted click position to the vertical center of closest horizontal white space. Control is transferred to block 245 where the system determines from the drop down box 5 in FIG. 1, whether the white space graphic is to be positioned on the left or right side of the document. FIG. 2A illustrates the markup function Insert Between Words with the white space graphic located on the left side of the document. If the left side of the original digitized document was selected, or neither left nor right side was selected, the left side of the document is automatically selected for the location of the white space graphic. Control is transferred to block 250 where a horizontal connector segment 20 is drawn between the top of the vertical connector segment 15 and the left side margin. Otherwise, if the user had selected the right side of the document for the White Space Graphic from the drop down box 5 in FIG. 1, then control is transferred to block 255 where a horizontal connector line is drawn between the vertical connector line and the right side margin. From either block 250 or 255 control is then transferred to block 310 as shown in FIG. 11, to draw the white space graphic in either the left or right margin or the top or bottom margin as preselected.

FIG. 2A shows an example of markup function Insert Between Words when the left side of the top margin is chosen as the location for the white space graphic 40. FIG. 11 shows the system logic for completing the connector and positioning the white space graphic 40 in the top margin and control begins at block 310. At block 310 the system determines whether to draw the white space graphic 40 in the left or right margin as previously determined in FIG. 9 or locate the white space graphic in the top or bottom margin as preselected. If neither the top nor bottom margin was selected from the drop down box 5 in FIG. 1, then the system defaults to the previously determined left or right margin for the position of the white space graphic at the same level as the connector. Control is transferred to block 315 to draw the white space graphic 35 adjacent to the end of the horizontal connector segment 20 in the mid left margin as shown in FIG. 2. However, if the top margin is selected for the white space graphic, as in FIG. 2A, control is transferred to block 320 and the system draws a vertical line connector 30 to the top margin from the end of the horizontal connector line 20 in the left margin. Control is then transferred to block 325 where the system draws a horizontal connector line 35 from the end of the vertical line connector 30 in the top margin to a predetermined distance along the top margin of the document. Control is then transferred to block 350 and the white space graphic is drawn adjacent to the last horizontal connector line 35. The resulting markup cluster is shown in FIG. 2A.

Figure 3:
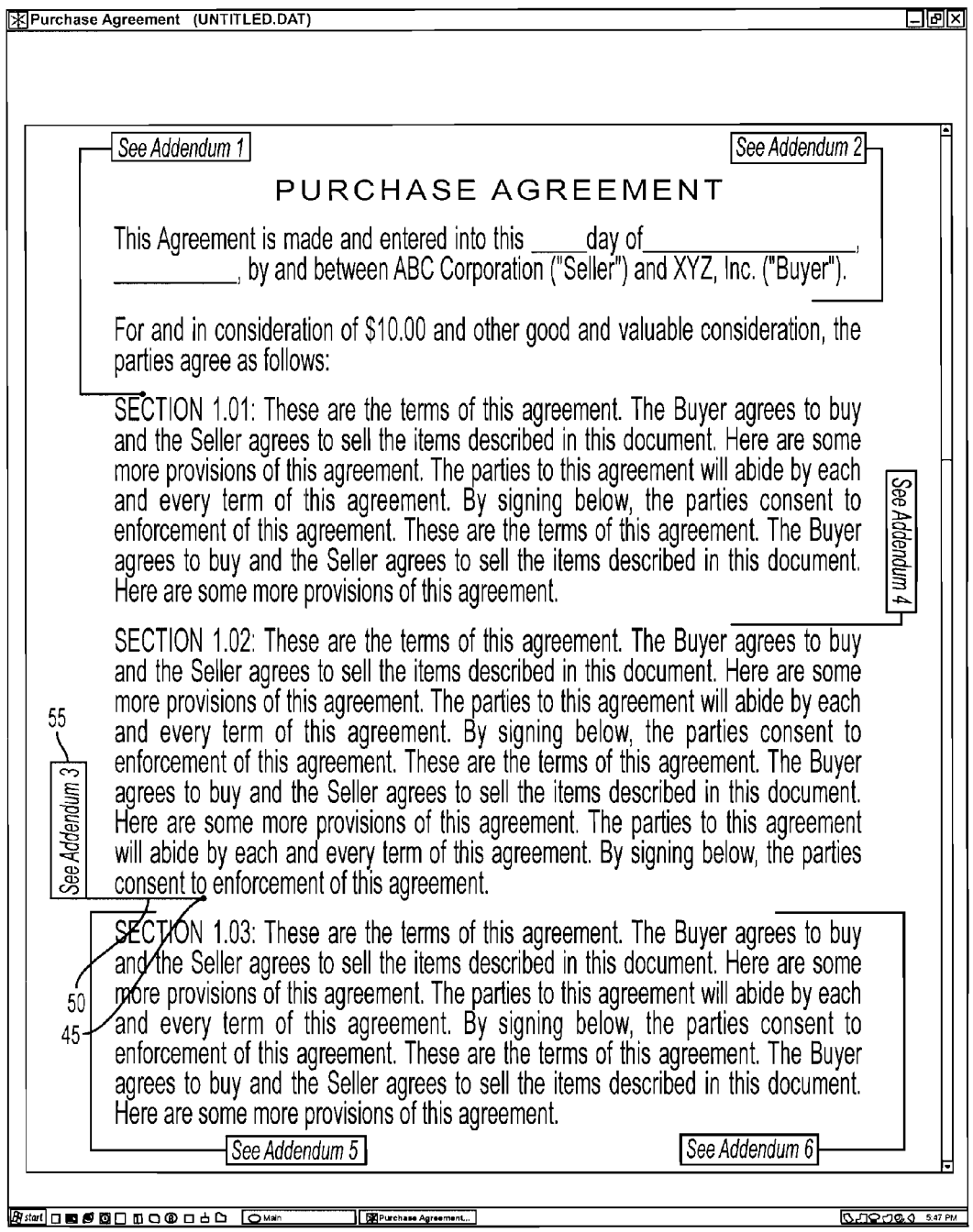
FIG. 3 is an example of the markup function Insert Between Text Lines.
Figure 3A:
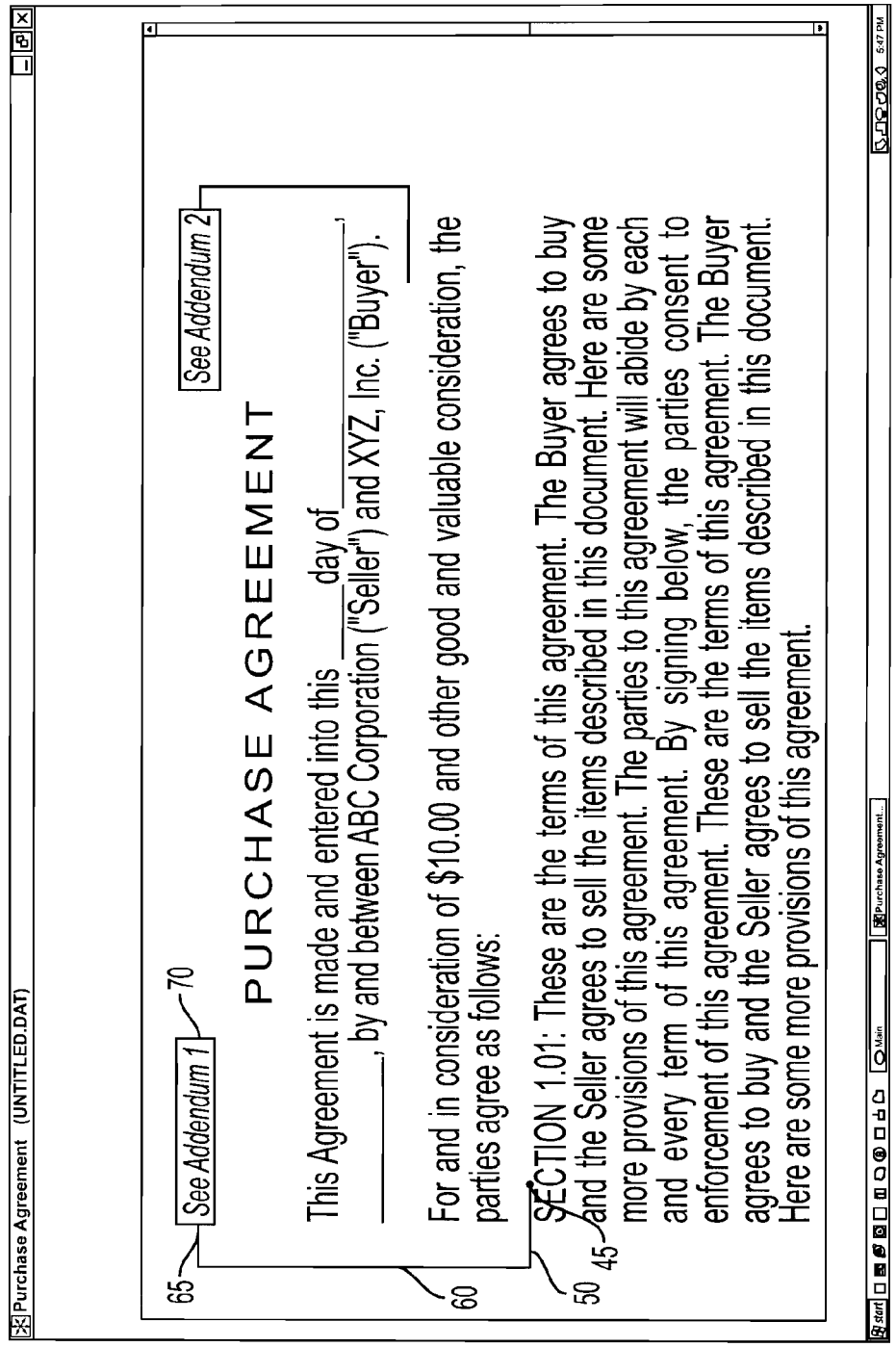
FIG. 3A is an enlargement of FIG. 3 showing the elements of the markup function Insert Between Text Lines.

FIGS. 3 and 3A show examples of the markup function "Insert Between Text Lines". In FIG. 3 the markup function Insert Between Text Lines is a cluster consisting of: a reference graphic which is a dot 45; a connector 50; and white space graphic 55. In FIG. 3A, the markup function Insert Between Text Lines is a cluster consisting of: a reference graphic which is a dot 45; a connector with line segments, 50, 60, and 65; and white space graphic 70. For the markup function Insert Between Text Lines, the user enters the text to be inserted in the white space graphic over the original document 2, into the Text Entry Box 3 of FIG. 1. Then, using the mouse, the user positions the cursor between the lines of text over the original document 2 where the insertions should occur, and clicks the mouse.

FIG. 7 illustrates the internal logic of the system for markup functions. At Block 130, the system waits for input. On input, control is transferred to block 135. If input is text, control is transferred to block 131 where character(s) are appended to the previously entered text string. Control is then transferred back to block 130. For markup function Insert Between Text Lines, when the user is finished entering text, the user inputs a click via the mouse and control is transferred to block 135. The system then determines that a click was entered and control is transferred to block 140. If no text has been entered, control is transferred to block 130. If text was previously entered control is transferred to block 145 then the reference graphic is a dot and control is transferred to block 150. At block 150 the system determines whether the click position falls on a line of text. For markup function Insert Between Text Lines, since the mouse click is not on a line of text control is transferred to block 152, where the received click position is adjusted vertically half-way between adjacent lines of text. Control is then transferred to block 155 to draw the reference graphic, which is a dot, at the adjusted click position. Control is transferred to block 220 as shown in FIG. 8.

Figure 8:
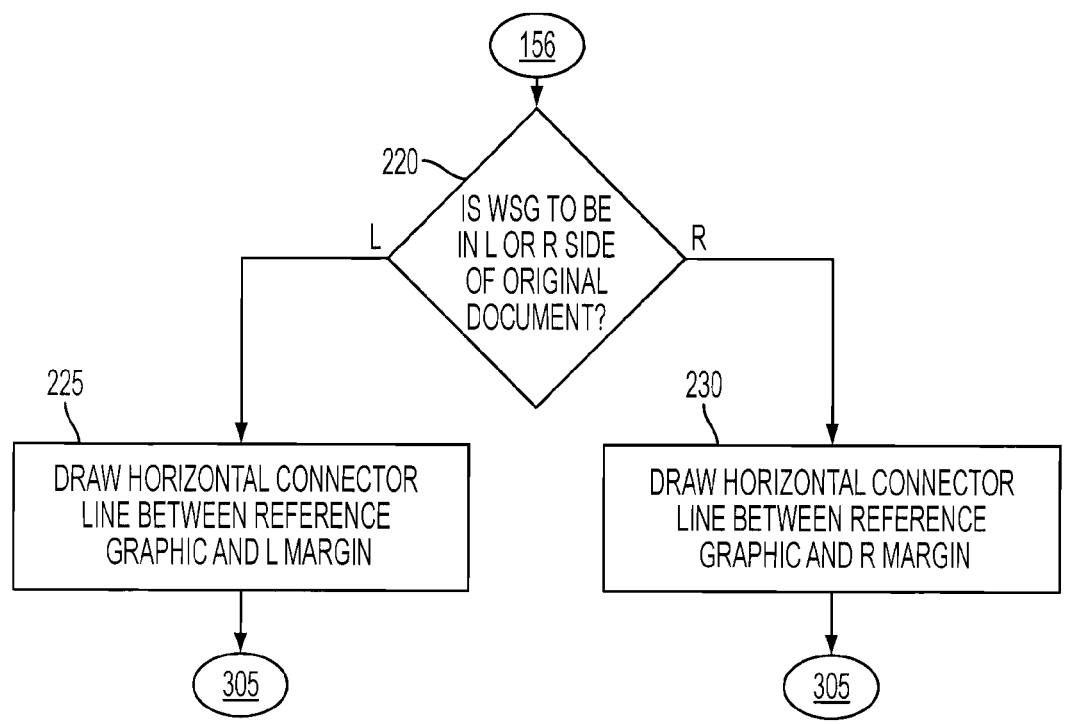
FIG. 8 applies to the markup function Insert Between Text Lines and illustrates the system logic for generating the connector from a reference graphic which is a dot to the white space within the left or right margin of the document.

For markup function Insert Between Text Lines FIGS. 8 and 11 illustrate the system logic for creating a connector from the reference graphic (which is a dot in this case), to the white space graphic. Preferences for location of the white space graphic within the margin of the document may be selected from the Drop Down box 5 shown in FIG. 1. If the user has not selected a position for the white space graphic, then the system defaults to the left margin. FIGS. 3 and 3A illustrate several markup clusters created using various chosen locations for the white space graphic for markup function Insert Between Text Lines.

In FIG. 8, control starts at block 220 where the system determines from the drop down box 5 in FIG. 1, whether the white space graphic is to be positioned on the left or right side of the document. FIGS. 3 and 3A illustrate the markup function Insert Between Text Lines with the white space graphic located on the left side of the document. If the left margin was selected, or neither left nor right margin was selected, the left side of the document is automatically selected for the location of the white space graphic. Control is transferred to block 225 where a horizontal connector segment 50 is drawn between the reference graphic 45 (which is a dot in this case) and the left side margin. Otherwise, if the user had selected the right side of the document for the White Space Graphic from the drop down box 5 in FIG. 1, then control is transferred to block 230 where a horizontal connector line is drawn between reference graphic and the right side margin. From either block 225 or 230 control is then transferred to block 310 as show in FIG. 11, to draw the white space graphic in either the left or right margin or the top or bottom margin as preselected.

FIG. 3A shows an example of markup function Insert Between Text Lines when the left side of the top margin is chosen as the location for the white space graphic 70. FIG. 11 shows the system logic for positioning the white space graphic 70 in the top margin and control begins at block 310. At block 310 the system determines whether to draw the white space graphic 70 in the left or right margin as previously determined in FIG. 8 or locate the white space graphic in the top or bottom margin as preselected If neither the top or bottom margin was selected from the drop down box 5 in FIG. 1, then the system defaults to the previously determined left or right margin for the position of the white space graphic at the same horizontal level as the connector. Control is transferred to block 315 to draw the white space graphic 55 adjacent to the end of the horizontal connector segment 50 in the mid left margin as shown in FIG. 3. However, if the top margin is selected for the white space graphic, as in FIG. 3A, control is transferred to block 320 and the system draws a vertical line connector 60 to the top margin from the end of the horizontal connector line 50 in the mid left margin. Control is then transferred to block 325 where the system draws a horizontal connector line 65 from the end of the vertical line connector 60 in the top margin to a predetermined distance along the top margin of the document. Control is then transferred to block 350 and the white space graphic 70 is drawn adjacent to the last horizontal connector line segment 65. The resulting markup cluster is shown in FIG. 3A.

Figure 4:
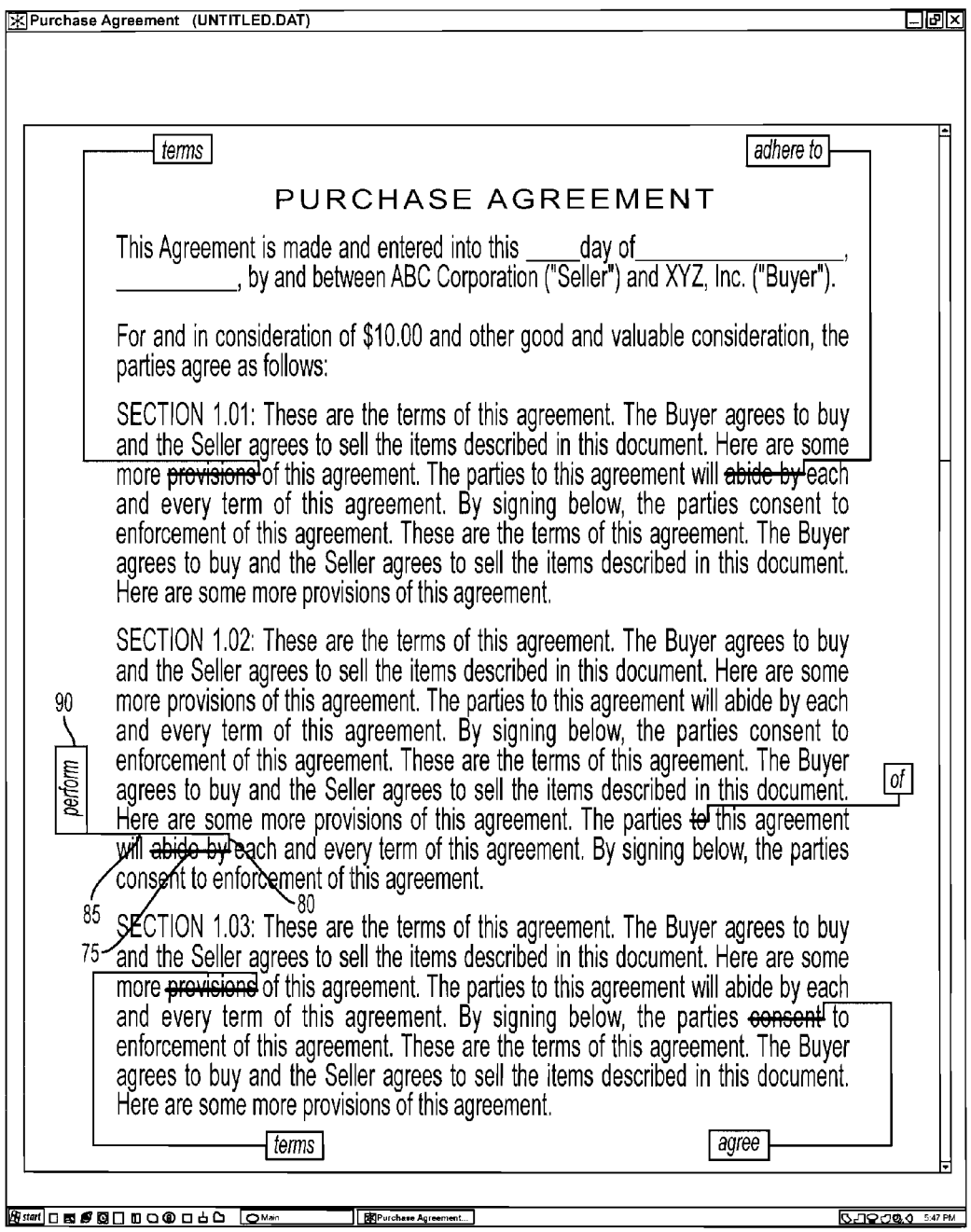
FIG. 4 is an example of the markup function Line Strikeout and Replace.
Figure 4A:
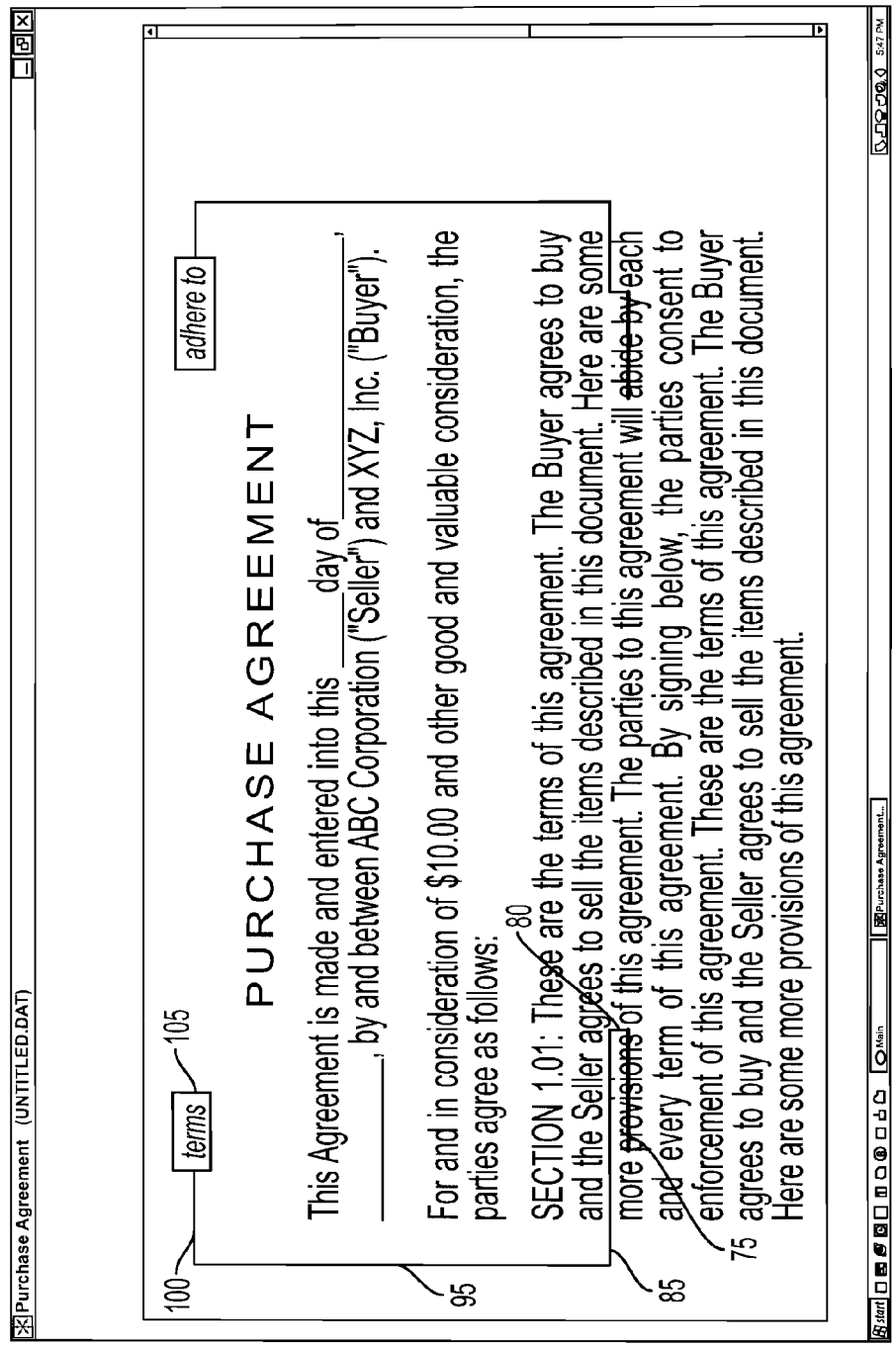
FIG. 4A is an enlargement of FIG. 4 showing the elements of the markup function Line Strikeout and Replace.

FIGS. 4 and 4A show examples of the markup function "Line Strikeout and Replace". In FIG. 4 the markup function Line Strikeout and Replace is a cluster consisting of: a strikeout 75 as a reference graphic; a connector with line segments 80 and 85; and white space graphic 90. In FIG. 4A the markup function Line Strikeout and Replace is a cluster consisting of: a strikeout 75 as a reference graphic; a connector with line segments 80, 85, 95, and 100; and white space graphic 105. The strikeout 75 reference graphic is a horizontal strikeout line superimposed over horizontal text at the desired strikeout position. For the markup function Line Strikeout and Replace, the user enters the text to be inserted in the white space graphic over the original document 2, into the Text Entry Box 3 of FIG. 1. Then, using the mouse, the user positions the cursor over the first character in the original document 2 to be stricken and replaced, and drags the mouse over each text character and space to be stricken or replaced. The user may choose not to enter text into the Text Entry Box 3 of FIG. 1, but instead may choose to only strike out a word or words. The user may choose a strikeout style from the various options 4, as shown in FIG. 1, including but not limited to a single line strikeout or a series of repeating x's or other characters.

FIG. 7 illustrates the internal logic of the system for markup functions. At Block 130, the system waits for input. On input, control is transferred to block 135. If input is text, control is transferred to block 131 where character(s) are appended to the previously entered text string and control is then transferred back to block 130. For markup function Line Strikeout and Replace, when the user is finished entering text, the user inputs two points via the mouse and control is transferred from block 135, where the system determines that a drag was entered, to block 180. At block 180, the start and end points of the drag are adjusted vertically to center on their line of text. Control is then transferred to block 185 to adjust the start and end points of drag to center horizontally between characters. Control is then transferred to block 190, where the system determines if the input device/mouse was dragged over more than one line of text. If the mouse was not dragged over more than one line of text, control is transferred to block 195 where the reference graphic is a single line strikeout between the adjusted start and end points of drag. Control is then transferred to block 215 to draw the reference graphic. Control is then transferred to block 216 where the system determines whether text was entered. If text was entered, control is transferred to block 260 to add the connector and white space graphic as shown in FIGS. 10 and 11.

Figure 10:
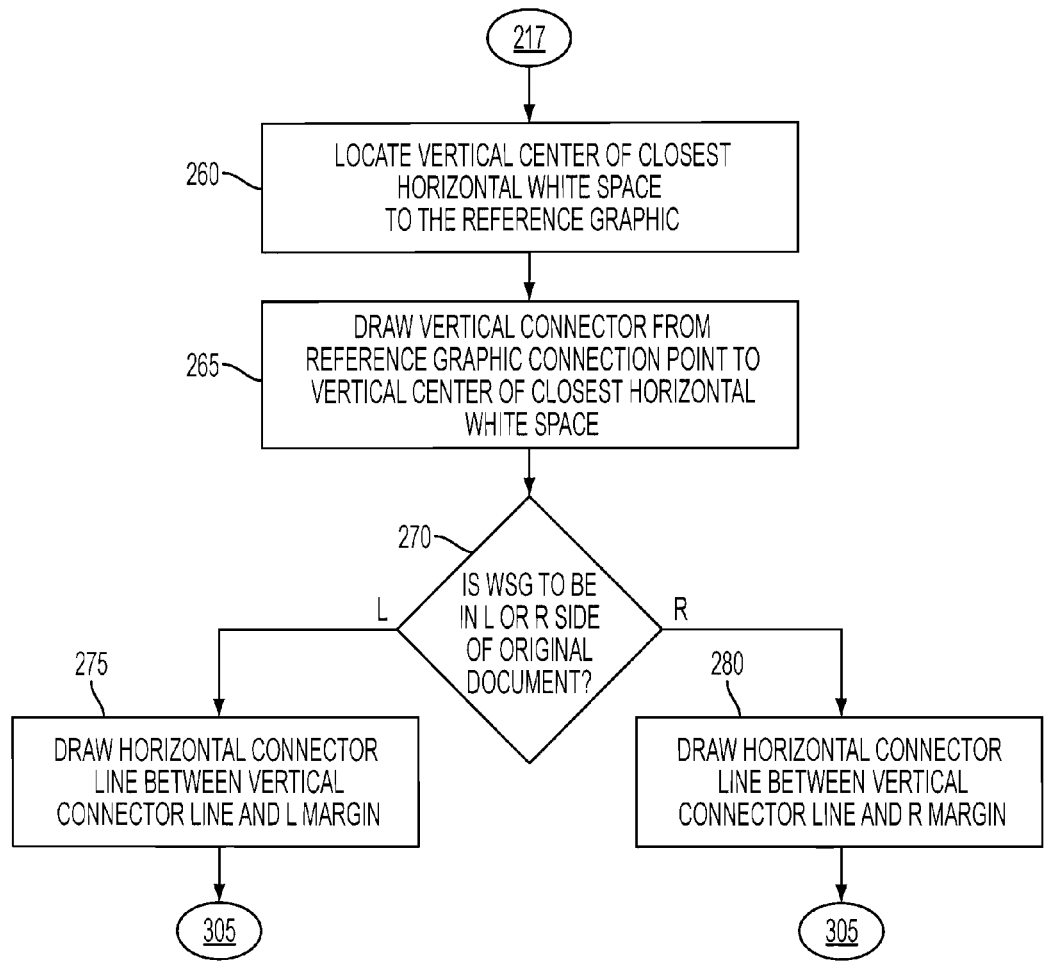
FIG. 10 applies to the markup functions Z Strikeout and Replace, Line Strikeout and Replace, and Adjacent Line Strikeout and Replace. It illustrates the system logic for generating the connector that extends from a reference graphic connection point to white space within the left or right margin of the document.

In FIG. 10, control starts at block 260 to locate the vertical center of a closest horizontal white space to the reference graphic. Control is then transferred to block 265 to draw the vertical connector segment 80, shown in FIGS. 4 and 4A, from the reference graphic connection point to the vertical center of closest horizontal white space. Control is transferred to block 270 where the system determines from the drop down box 5 in FIG. 1, whether the white space graphic is to be positioned on the left or right side of the document. FIG. 4 illustrates the markup function Line Strikeout and Replace with the white space graphic located on the left side of the document. If the left margin was selected or neither left nor right margin was selected, the left side of the document is automatically selected for the location of the white space graphic. Control is transferred to block 275 where a horizontal connector segment 85 is drawn between the vertical connector segment 80 and the left side margin. Otherwise, if the user had selected the right side of the document for the white space graphic from the drop down box 5 in FIG. 1, then control is transferred to block 280 where a horizontal connector line is drawn between the vertical connector line and the right side margin. From either block 275 or 280 control is then transferred to block 310 as shown in FIG. 11, to draw the white space graphic in either the left or right margin or the top or bottom margin as previously described in the discussion of FIG. 11 above for the Insert Between Text Lines markup function.

Figure 5:
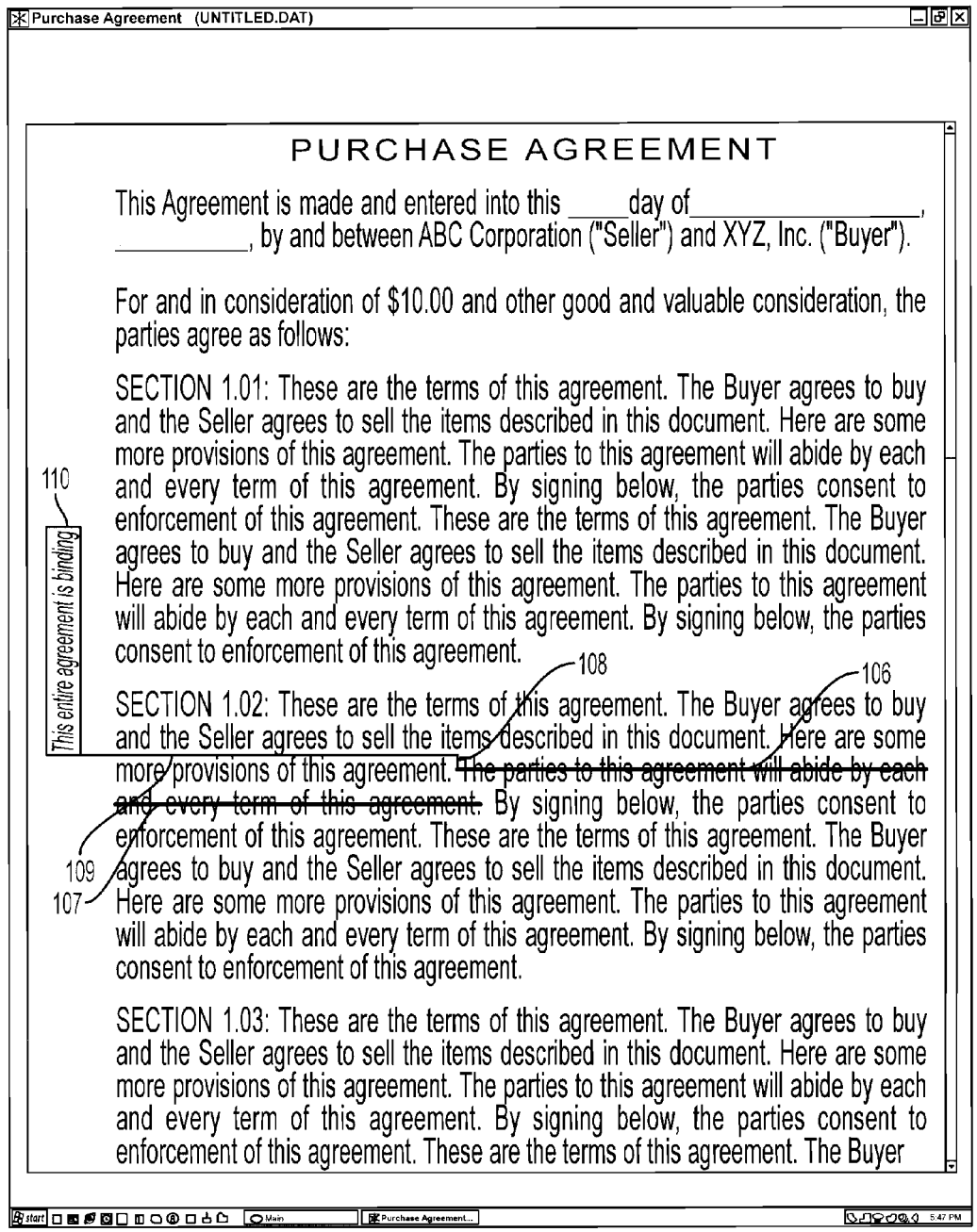
FIG. 5 is an example of the markup function Adjacent Line Strikeout and Replace.
Figure 5A:
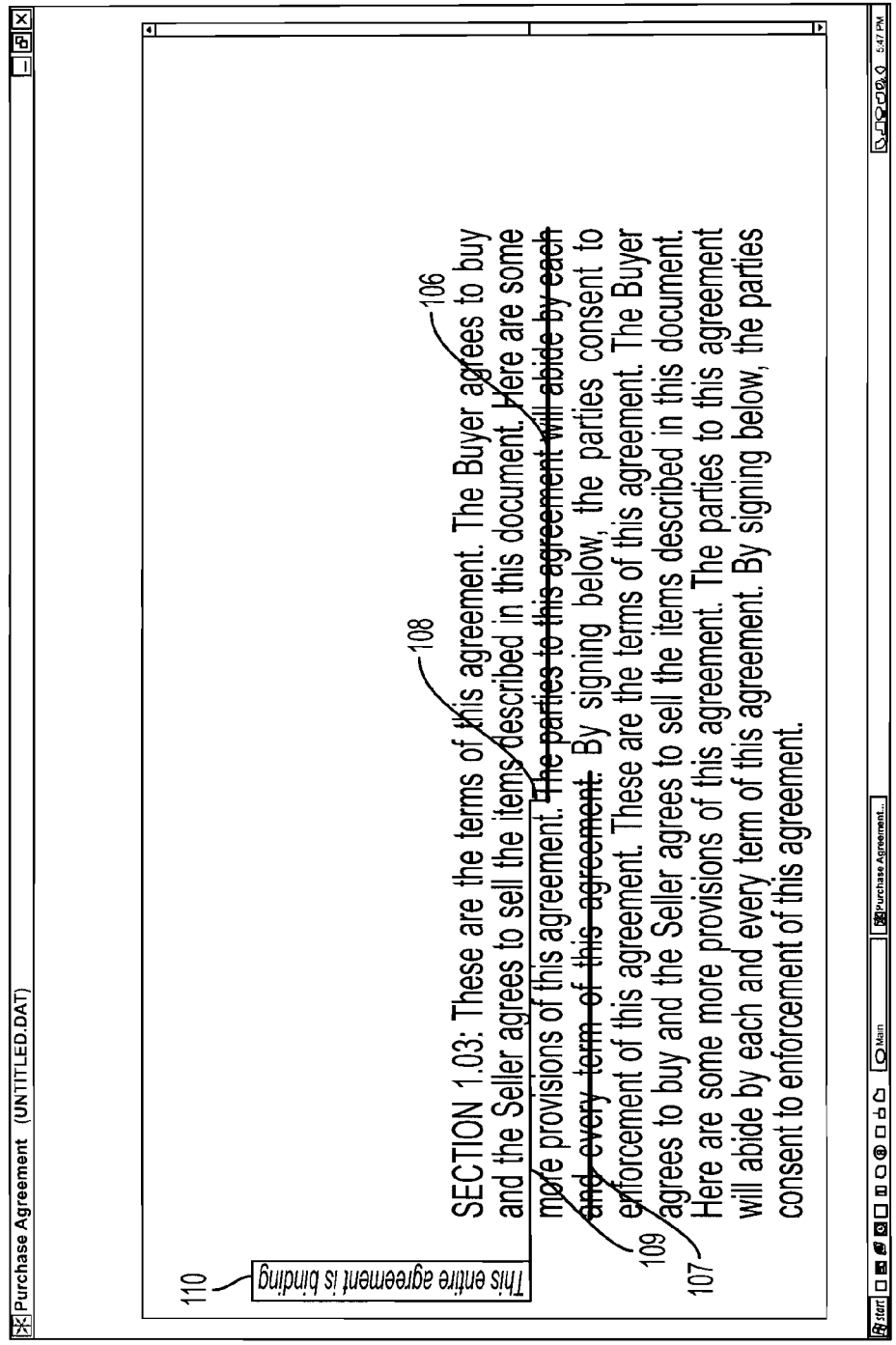
FIG. 5A is an enlargement of FIG. 5 showing the elements of the markup function Adjacent Line Strikeout and Replace.

FIGS. 5 and 5A show an example of the markup function "Adjacent Line Strikeout and Replace" which is a cluster consisting of: an adjacent line strikeout reference graphic with line strikeout elements 106 and 107; a connector consisting of line segments 108 and 109; and white space graphic 110. The two adjacent line strikeout elements 106 and 107 are positioned over two adjacent horizontal lines of text.

FIGS. 7, 10, and 11 illustrate the system logic for achieving the markup function Adjacent Line Strikeout and Replace. In FIG. 7, control begins at block 130 as previously described for Line Strikeout and Replace markup function. From block 190, if the input device/mouse dragged downward over greater that one line of text, control is transferred to block 200 where the system determines whether the input device was dragged over greater than two lines of text. If the input device/mouse is not dragged downward over greater than two lines of text control is transferred to block 205 and the reference graphic is an Adjacent Line Strikeout consisting of a horizontal line from the adjusted start point of drag to end of upper text line, and a horizontal line from adjusted end point of drag to beginning of lower text line. Control is then transferred to 215 to draw the reference graphic and transfer control to block 216 to determine whether text was entered. If no text was entered, the markup function is complete and control is transferred back to block 130. If text was entered control is transferred to block 260 to add the connector and the white space graphic as previously described above in the discussion of FIGS. 10 and 11 for the markup function Line Strikeout and Replace. In other embodiments of this invention, the Adjacent Line Strikeout could span or overlay more than two lines of text in the original digitized document.

Figure 6:
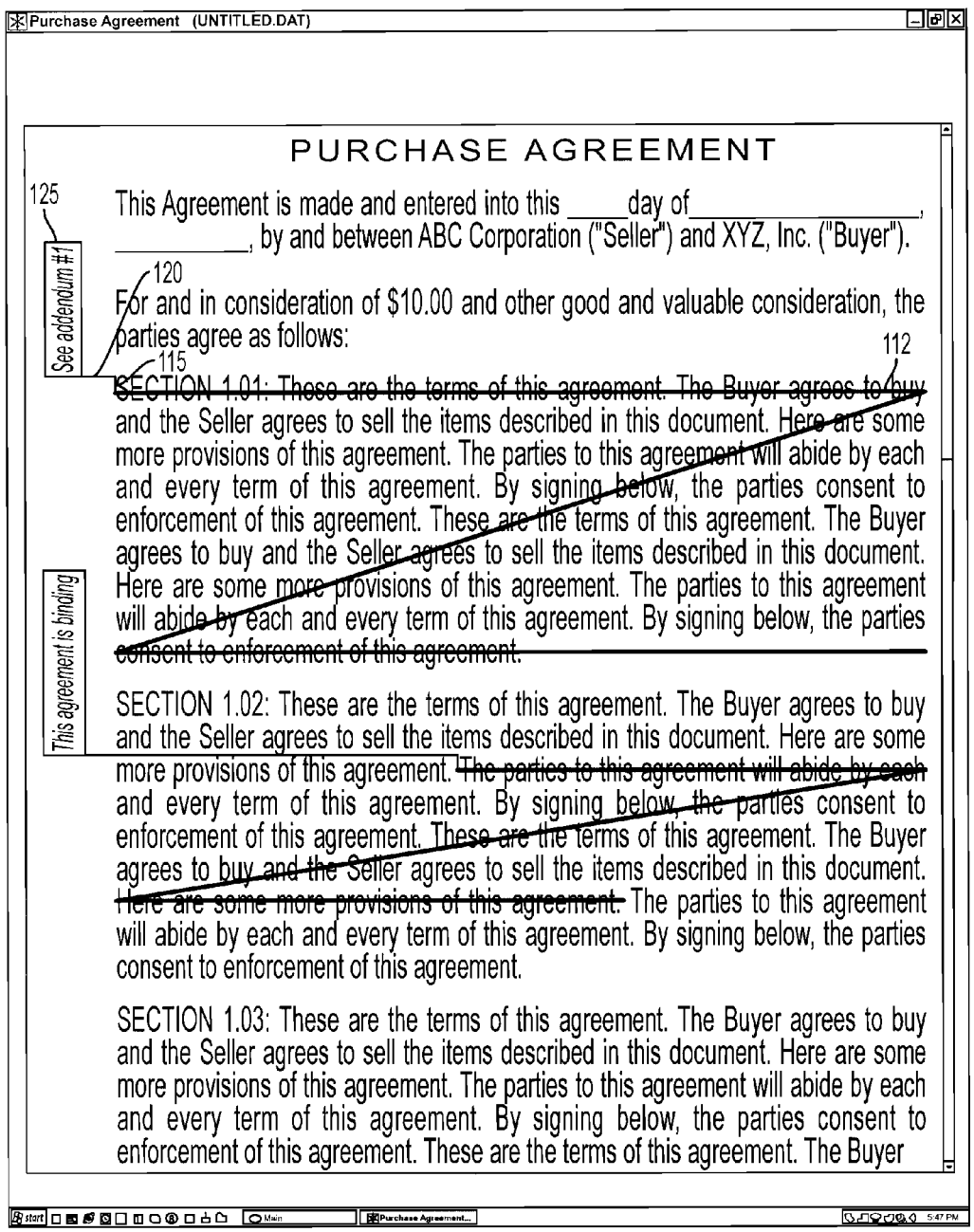
FIG. 6 is an example of the markup function Z Strikeout and Replace.
Figure 6A:
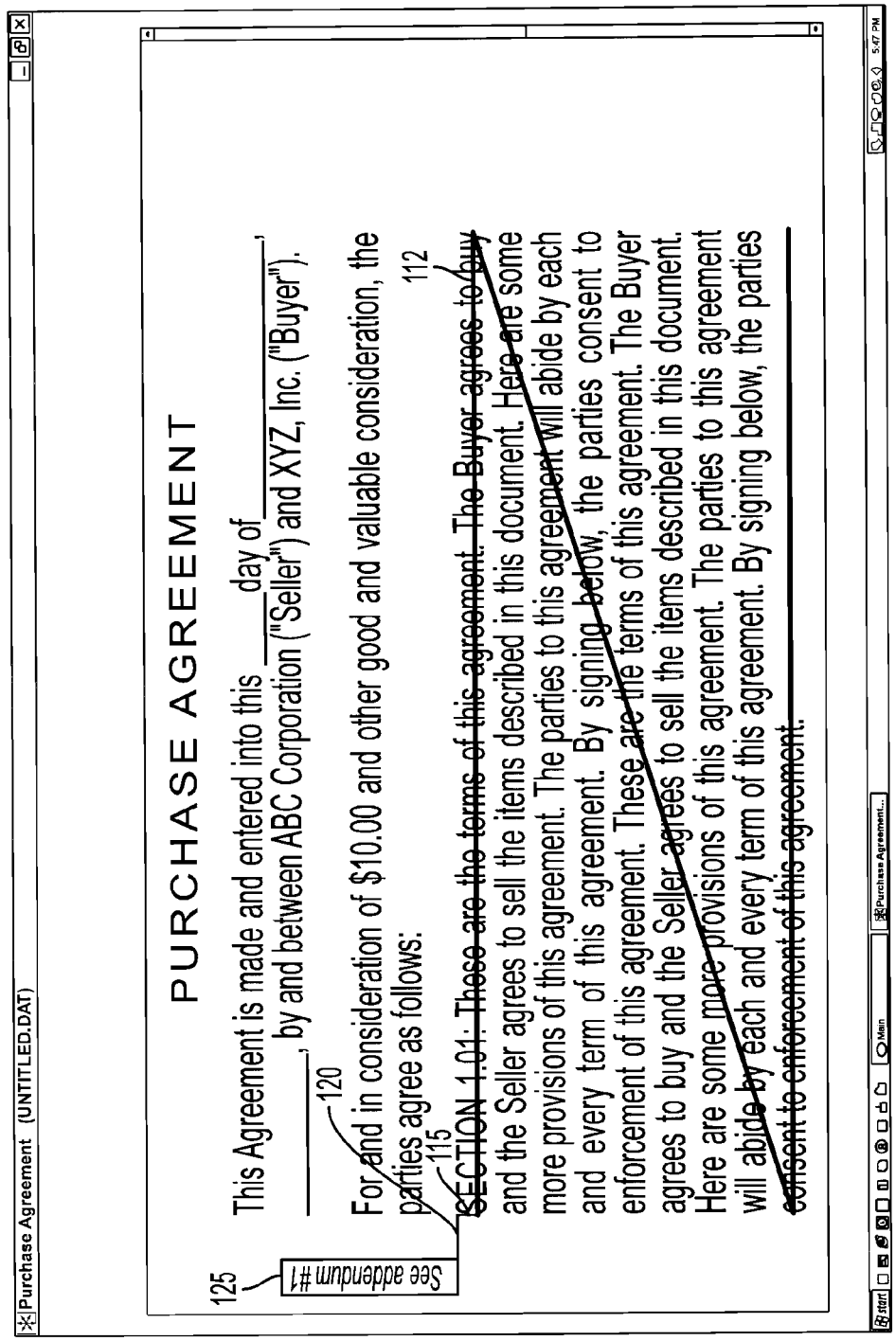
FIG. 6A is an enlargement of FIG. 5 showing the elements of the markup function Z Strikeout and Replace.

FIGS. 6 and 6A show an example of the markup function "Z Strikeout which is a cluster consisting of: a Z strikeout 112 as a reference graphic; a connector consisting of line segments 115 and 120; and white space graphic 125. The Z strikeout 112 reference graphic is a strikeout forming a large "Z" which is superimposed over greater than two horizontal lines of text.

FIGS. 7, 10, and 11 illustrate the system logic for achieving the markup function Z Strikeout and Replace. In FIG. 7, control begins at block 130 as previously described for Strikeout and Replace markup function. From block 190, if the input device/mouse is dragged downward over greater that one line of text, control is transferred to block 200 where the system determines whether the input device was dragged over greater than two lines of text. If yes, then the reference graphic added is a Z strikeout 112 as shown in FIGS. 6 and 6A. Control is then transferred to block 210 where the reference graphic is a horizontal line beginning at the adjusted start point of the drag to the end of the upper text line, and a horizontal line from the adjusted end point of drag to the beginning of the lower text line, and a diagonal line between the end of the upper horizontal line and beginning of the lower horizontal line, forming a "Z". Control is then transferred to block 215 to draw the reference graphic and then to block 216, where the system determines whether text was entered and if text was not entered, control is transferred back to block 130. If text was entered at block 216, then control is transferred to block 260 to add the connector and white space graphic as previously described in the discussion of FIGS. 10 and 11 for markup function Line Strikeout and Replace.

In another embodiment of the invention, the system may include settings where the user drags the mouse or input device over greater than two lines of text to determine whether an Adjacent Line Strikeout or a Z Strikeout is added as described herein.

In another embodiment of the invention, when the user drags a mouse over two or more lines of text, the system may include a setting that determines the maximum number of lines of text that a mouse drag covers in order to add an Adjacent Line Strikeout reference graphic. The setting may be such that when the number of lines of text covered by the mouse drag is greater than one, but less than or equal to the setting, then the reference graphic added is an Adjacent Line Strikeout; and when the number of lines of text covered by the mouse drag exceeds the setting, then the reference graphic added is a Z strikeout. For example, for a chosen setting of three lines of text, a mouse drag over more than three lines of text adds a Z Strikeout reference graphic; and a mouse drag over three or less lines of text, but greater than one line of text, adds an Adjacent Line Strikeout. The setting may be adjusted individually for each markup cluster depending on the user's needs and preference. The user input of a drag and the user input device of a mouse are not meant to be limiting and may be any suitable alternatives known to one skilled in the art to which this invention belongs.

Manipulation of markup clusters is automated. A reference graphic may be moved to a new user-defined location. Typically, that is accomplished by dragging it with a mouse or other input device to a new location over the original digitized document text. Then, the program automatically regenerates and relocates the white space graphic and regenerates the connector that extends from the new location of the reference graphic to the white space graphic.

If a reference graphic is chosen from a user-defined location generated from two points (e.g., a mouse drag), then the user, in addition to being able to move the entire reference graphic, may instead choose to alter the reference graphic by moving only one of the points, by dragging the anchor of one of the points with a mouse. Then, the program automatically regenerates the reference graphic using the revised user-defined location, which is determined from the newly moved point and the original point that was not moved. Then, the program automatically generates the connector that extends from the revised reference graphic to the white space graphic.

The white space graphic may be moved to a new location in the white space of the document, by dragging it with a mouse. Then, the connector is regenerated and extends from the reference graphic to the revised user-defined location of the white space graphic.

In other embodiments of this invention, connectors or line segments may appear to touch text if the space between text or between two lines is too small or narrow, however this is not detrimental to their function as long as connectors do not cross text or characters. Additionally, connectors and their line segments can take on different styles, such as dashed lines, squiggly lines, or zigzag lines of various thickness and colors.

The invention disclosed in the preferred embodiment herein is also a computer program product for displaying and printing a markup cluster which comprises a reference graphic, a connector, and a white space graphic over an original digitized document containing text. The computer program product contains a computer usable medium with a machine readable code embodied therein for generating content for a computer. The original digitized document is displayed on the computer screen and the computer receives text from an input device or selects text from a list. The computer also receives, from an input device, a user-defined location over the display of the original digitized document and then automatically determines the desired type and location of the reference graphic from the received user-defined location. The computer program product automatically generates and overlays the reference graphic over the original digitized document and automatically determines the location for the white space graphic. Subsequently, the white space graphic with the received or selected text is automatically generated and overlaid over the original digitized document. A connector is automatically generated between the reference graphic and the white space graphic, such that the connector does not cross over any text, completing the markup cluster. The user is able to optionally print the original digitized document overlaid with the markup cluster in the same relative size and location as displayed on the computer screen.

The reference graphic generated by the computer program product described above varies depending on the received user-defined location relative to the original digitized document text. Where the received user-defined location is two points in the same line of text, the computer program product automatically determines that the reference graphic is a line strikeout located between the two points over the original digitized document. Where the received user-defined location is a single point between two adjacent characters or, the computer program product automatically determines that the reference graphic is a point type reference graphic positioned between the two adjacent characters over the original digitized document. Where the received user-defined location is a single point between two adjacent lines of text, the computer program product automatically determines that the reference graphic is a point type reference graphic positioned between the two adjacent lines of text over the original digitized document. Where the received user-defined location consists of a first point which is located in a line of text and a second point which is located in an adjacent line of text, the computer program product automatically determines that the reference graphic is an Adjacent Line Strikeout reference graphic. The Adjacent Line Strikeout graphic is positioned over the text that lies between the first point and the second point in two adjacent lines of text over the original digitized document. Where the received user-defined location consists of a first point which is located in a line of text and a second point which is located in a line of text that is not adjacent to the line of text containing the first point, the computer program product automatically determines that the reference graphic is a Z strikeout. The Z strikeout is positioned between the first point and second point over the original digitized document. The variations of the reference graphic described herein are not meant to be limiting or all encompassing.

The computer program product for displaying and printing a markup cluster, in the preferred embodiment, also discloses an option for the user to enter a general location preference for the white space graphic via an input device from a drop down menu and optionally revise the location of the white space graphic and/or the reference graphic. As described herein, the computer program product contains a computer usable medium with a machine readable code embodied therein for generating content for a computer. The original digitized document is displayed on the computer screen. Optionally, the user enters a general location preference for the white space graphic via an input device on a drop down menu in the computer program product. The computer receives text from an input device or selects text from a list and also, from an input device, receives a user-defined location over the display of the original digitized document. The computer program product automatically determines the desired type and location of the reference graphic from the received user-defined location, then generates and overlays the reference graphic over the original digitized document. The computer program product automatically determines the location for the white space graphic within the area determined by the user-entered general location preference for the white space graphic. Automatically, the computer program product generates and overlays the white space graphic with the received or selected text, then automatically generates a connector between the reference graphic and the white space graphic, such that the connector does not cross over text.

Optionally, the computer program product receives a revised location for the white space graphic by the user entering a user-defined location for the white space graphic from the input device and automatically relocates the white space graphic. A connector is regenerated between the reference graphic and the white space graphic, at its revised location, such that the connector does not cross over text. Optionally the computer receives a revised user-defined location for the reference graphic from an input device. Then the computer program product automatically determines the desired type and location of reference graphic from the received revised user-defined location; automatically regenerates and overlays the reference graphic over the original digitized document; and then automatically regenerates and overlays the connector between the reference graphic and the white space graphic over the original digitized document, such that the connector does not cross over any text. The user is able to optionally print the original digitized document overlaid with the markup cluster in the same relative size and location as displayed on the computer screen.

The reference graphic generated by the computer program when the user optionally revises the location of the white space graphic and or the reference graphic varies depending on the revised user-defined location relative to the original digitized document text. Where the revised user-defined location is two points in the same line of text, the computer program product automatically determines that the reference graphic is a line strikeout located between the two points over the original digitized document. Where the revised user-defined location is a single point between two adjacent characters, the computer program product automatically determines that the reference graphic is a point type reference graphic positioned between the two adjacent characters over the original digitized document. Where the revised user-defined location is a single point between two adjacent lines of text, the computer program product automatically determines that the reference graphic is a point type reference graphic positioned between the two adjacent lines of text over the original digitized document. Where the revised user-defined location consists of a first point which is located in a line of text and a second point which is located in an adjacent line of text, the computer program product automatically determines that the reference graphic is an adjacent line strikeout reference graphic. The adjacent line strikeout graphic is positioned over the text that lies between the first point and the second point in two adjacent lines of text over the original digitized document. Where the revised user-defined location consists of a first point which is located in a line of text and a second point which is located in a line of text that is not adjacent to the line of text containing the first point, the computer program product automatically determines that the reference graphic is a Z strikeout. The Z strikeout is positioned between the first point and second point over the original digitized document. The variations of the reference graphic described herein are not meant to be limiting or all encompassing.

In another embodiment of the invention, the computer program product may include alternate settings for determining whether an Adjacent Line Strikeout or a Z Strikeout is added as described herein. The settings depend on the number of lines of text, where the received user-defined location consists of a first point which is located in a line of text and second point which is located in another line of text. The setting may be such that when the number of lines of text covered by the mouse drag is greater than one, but less than or equal to the setting, then the computer program product adds an Adjacent Line Strikeout reference graphic; and when the number of lines of text covered by the mouse drag exceeds the setting, then the reference graphic added is a Z strikeout. For example, for a setting of three lines of text the computer program product adds a Z Strikeout reference graphic with a mouse drag over more than three lines of text; and adds an Adjacent Line Strikeout with a mouse drag over three or less lines of text, but greater than one line of text. The setting may be adjusted individually for each markup cluster depending on the user's needs and preference. The user input of a drag and the user input device of a mouse are not meant to be limiting and may be any suitable alternatives known to one skilled in the art to which this invention belongs.

EQUIVALENTS

Those skilled in the art will recognize, or be able to ascertain using no more than routine experimentation, many equivalents to the specific embodiments of the invention described herein. Such equivalents are intended to be encompassed by the claims.

What is claimed is:
1. A method of editing a digitized document, the method comprising the steps of:
    displaying the digitized document in a display area of a GUI;
    receiving a first portion of text in response to a first user input event;

defining a first region of the digitized document including at least one point in response to a second user input event;

generating a reference graphic within the first region without additional user input;

generating a white space graphic containing the first portion of text within a second region of the digitized document, the second region being within the white space of the digitized document without additional user input; and generating a connector that connects the white space graphic and the reference graphic without additional user input.

2. The method of claim 1, wherein the reference graphic, the white space graphic and the connector are overlayed on top of the digitized document.

3. The method of claim 2, wherein a new digitized document comprising the digitized document and any number of reference graphics, white space graphics and connectors may be further edited, saved, opened, closed and/or printed.

4. The method of claim 2, wherein the location of the second region is initially determined based on a third user input event.

5. The method of claim 1, wherein the connector does not cross over any text.

6. The method of claim 5, wherein the first region further contains a second portion of text that is located within a single line of text of the digitized document, and the reference graphic represents a strikeout of the second portion of text.

7. The method of claim 5, wherein the first region includes a point, and a point type reference graphic is generated at or near that point.

8. The method of claim 5, wherein the first region contains a second portion of text that is located within more than one line of text of the digitized document, and the reference graphic represents an adjacent line strikeout of the second portion of text.

9. The method of claim 5, wherein the first region contains a second portion of text that is located within more than one line of text of the digitized document, and the reference graphic represents a Z-strikeout of the second portion of text.

10. The method of claim 5, the steps further comprising:
relocating the second region of the digitized document to a new location within the white space of the digitized document based upon a third user input event,
regenerating the white space graphic within the second region, and
regenerating the connector so as to connect the reference graphic with the white space graphic.

11. The method of claim 5, the steps further comprising:
relocating the first region of the digitized document based upon a third user input event,
regenerating the reference graphic within the first region, and
regenerating the connector so as to connect the reference graphic with the white space graphic.

12. The method of claim 1, wherein the second region is located within a margin of the digitized document.

13. The method of claim 1, wherein the connector is comprised of one or more intersecting line segments.

14. A non-transitory computer readable medium storing a computer program for execution by at least one processing unit, the computer program comprising sets of instructions for:
displaying a digitized document in a display area of a GUI;
receiving a first portion of text in response to a first user input event;

defining a first region of the digitized document including at least one point in response to a second user input event;

generating a reference graphic within the first region without additional user input;

generating a white space graphic containing the first portion of text within a second region of the digitized document, the second region being within the white space of the digitized document without additional user input; and generating a connector that connects the white space graphic and the reference graphic without additional user input.

15. The non-transitory medium of claim 14, wherein the reference graphic, the white space graphic and the connector are overlayed on top of the digitized document.

16. The non-transitory medium of claim 15, wherein a new digitized document comprising the digitized document and any number of reference graphics, white space graphics and connectors may be further edited, saved, opened, closed and/or printed.

17. The non-transitory medium of claim 15, wherein the location of the second region is initially determined based on a third user input event.

18. The non-transitory medium of claim 14, wherein the connector does not cross over any text.

19. The non-transitory medium of claim 18, wherein the first region further contains a second portion of text that is located within a single line of text of the digitized document, and the reference graphic represents a strikeout of the second portion of text.

20. The non-transitory medium of claim 18, wherein the first region includes a point, and a point type reference graphic is generated at or near that point.

21. The non-transitory medium of claim 18, wherein the first region contains a second portion of text that is located within more than one line of text of the digitized document, and the reference graphic represents an adjacent line strikeout of the second portion of text.

22. The non-transitory medium of claim 18, wherein the first region contains a second portion of text that is located within more than one line of text of the digitized document, and the reference graphic represents a Z-strikeout of the second portion of text.

23. The non-transitory medium of claim 18, the instructions further comprising:
relocating the second region of the digitized document to a new location within the white space of the digitized document based upon a third user input event,
regenerating the white space graphic within the second region, and
regenerating the connector so as to connect the reference graphic with the white space graphic.

24. The non-transitory medium of claim 18, the instructions further comprising:
relocating the first region of the digitized document based upon a third user input event,
regenerating the reference graphic within the first region, and
regenerating the connector so as to connect the reference graphic with the white space graphic.

25. The non-transitory computer readable medium of claim 14, wherein the second region is located within a margin of the digitized document.

26. The non-transitory computer readable medium of claim 14, wherein the connector is comprised of one or more intersecting line segments.

\* \* \* \* \*